US008801936B2

(12) United States Patent
Grass et al.

(10) Patent No.: US 8,801,936 B2
(45) Date of Patent: Aug. 12, 2014

(54) CARBON COATED MAGNETIC NANOPARTICLES AND THEIR USE IN SEPARATION PROCESSES

(75) Inventors: Robert N. Grass, Zürich (CH); Wendelin Jan Stark, Zürich (CH)

(73) Assignee: ETH Zürich, Zürich (CH)

( * ) Notice: Subject to any disclaimer, the term of this patent is extended or adjusted under 35 U.S.C. 154(b) by 1044 days.

(21) Appl. No.: 12/513,823

(22) PCT Filed: Nov. 2, 2007

(86) PCT No.: PCT/CH2007/000544
§ 371 (c)(1),
(2), (4) Date: Oct. 22, 2009

(87) PCT Pub. No.: WO2008/055371
PCT Pub. Date: May 15, 2008

(65) Prior Publication Data
US 2010/0059449 A1    Mar. 11, 2010

(30) Foreign Application Priority Data

Nov. 9, 2006  (EP) ..................................... 06023307

(51) Int. Cl.
*C02F 1/48* (2006.01)
*B32B 1/00* (2006.01)
*H01F 1/00* (2006.01)

(52) U.S. Cl.
USPC ..... 210/695; 428/407; 428/402.2; 252/62.51; 252/62.55

(58) Field of Classification Search
USPC .............. 428/323, 320.2, 328, 689, 403, 407; 428/402; 427/216, 219, 223; 210/695
See application file for complete search history.

(56) References Cited

U.S. PATENT DOCUMENTS

| 5,547,748 | A | | 8/1996 | Rouf et al. |
| 5,554,739 | A | * | 9/1996 | Belmont ....................... 534/885 |
| 2003/0134409 | A1 | * | 7/2003 | Mallouk et al. ............ 435/262.5 |
| 2005/0116195 | A1 | * | 6/2005 | Tsang et al. ........... 252/62.51 R |
| 2005/0244644 | A1 | * | 11/2005 | Hampden-Smith et al. .. 428/408 |

FOREIGN PATENT DOCUMENTS

WO    WO2005/071136    8/2005

OTHER PUBLICATIONS

Ma et al. (Journal of Phys. Chem., 2006, 20118-20122).*
International Search Report in corresponding PCT/CH2007/000544 dated Sep. 4, 2008.
Bystrzejewski, et al., "Arc plasma route to carbon-encapsulated magnetic nanoparticles for biomedical applications," Science Direct [online] 109(1), 81-85, Aug. 25, 2005.

(Continued)

*Primary Examiner* — James J Seidleck
*Assistant Examiner* — S. Camilla Pourbohloul
(74) *Attorney, Agent, or Firm* — Marshall, Gerstein & Borun LLP

(57) ABSTRACT

The invention relates to a process for separating a dispersed phase from a continuous phase comprising the steps of i) contacting said phases with an effective amount of nanoparticles; ii) applying a magnetic field gradient to the obtained system; iii) separating the obtained phases wherein said nanoparticles are of the core shell type, said core consists of a metal or alloy having soft magnetic properties and said shell contains a graphene layers which are optionally functionalized; to new nanoparticles and method of manufacturing such nanoparticles.

23 Claims, 3 Drawing Sheets

(56) References Cited

OTHER PUBLICATIONS

Grass, R.N., "Covalently functionalized cobalt nanoparticles as a platform for magnetic separations in organic synthesis," *Angewandte Chemie* International Edition (46), 4909-4912 (May 22, 2007).

An-Hui Lu et al., "Highly stable carbon-protected cobalt nanoparticles and graphite shells," The Royal Society of Chemistry 2005 [online] 98-100, Nov. 17, 2004.

Ma et al., "Chemical functionalization of magnetic carbon-encapsulated nanoparticles based on acid oxidation," Journal of Physical Chemistry B, (110) 20118-20122, Feb. 9, 2006.

Schwickardi et al., "Scalable synthesis of activated carbon with superparamagnetic properties," The Royal Society of Chemistry 2006 [online] 1, 3, Aug. 8, 2006.

Yu et al., "Synthesis of carbon-encapsulated magnetic nanoparticles by spray pyrolsis of iron and carbonyl and ethanol," Science Direct [online] (43)14, 3018-3021, 2005.

* cited by examiner

CARBON COATED MAGNETIC NANOPARTICLES AND THEIR USE IN SEPARATION PROCESSES

TECHNICAL FIELD

The present invention relates to processes for separating one or more dispersed phases or dissolved materials from a continuous phase; to the use of nanoparticles in such separation processes, to new nanoparticles which are inter alia useful for such processes and to their synthesis.

BACKGROUND ART

Separation problems, such as the separation of a dispersed phase from a continuous phase, often occur in industry. Such separation may be part of manufacturing process, may be the isolation step of a starting material or end-product, or may be a step of a cleaning process.

Magnetic separation techniques in various forms are known in which contaminating oil is removed from water (e.g. after oil spills) circumventing the problems of water/oil separation using gravitational forces only. This is done by using magnetic particulates which have surfactants, polymers, dispersing agents or other oeleophilic chemicals attached or adsorbed to the particle surfaces.

GB1439031 proposes the use of magnetic fluids for cleaning up oil spills and describes the use of magnetic iron oxide particles produced by the precipitation of iron chlorides by the use of ammonium hydroxide with an oil soluble dispersing agent adsorbed to the surface of the particles.

GB2319023 describes the use of magnetite ($Fe_3O_4$) particulates which have a surfactant such as polyoxyethylene nonylphenylether adsorbed to the particle surface allowing a dispersion in organic solutions.

JP63042751 describes the use of a magnetic polymer affiliated with oil and trapping the oil to the polymer and attracting it with a magnet. The described magnetic polymers consist of a magnetite or cobalt ferrite ($CoFe_2O_4$) core with diameters below 200 nanometers deposited onto a polymer having a high affinity with oil.

US20050139550 describes the use of iron particles with a size between 1 and 100 micrometers (equivalent to a specific surface area between 0.6 m2/g and 0.006 m2/g) which have been made hydrophobic by reacting the iron particles with organic compounds having oleophilic chain ends such as saturated fatty acids.

It is believed that, an ideal magnetic separation process is characterized by the utilization of magnetic particles of low cost, high selectivity to one phase, low particle size and excellent magnetic properties. Theses properties should result in a maximum active surface area available for the attraction of the dispersed phase per magnetic unit. Prior art, as disclosed above, suffers from one or more disadvantages. Thus, the known techniques utilize either large particulates or materials of poor magnetic properties (e.g. saturation magnetization<100 A $m^2$/kg) and surface modifications of large (>C6) oleophilic adsorbants coating the particles further diminishing the overall particle magnetization and increasing the overall particle diameter. Large particles are not desired as they also slow down the movement of the particles in the liquid.

SUMMARY OF THE INVENTION

The present invention relates to the use of selective (in particular oleophilic), carbon coated, metallic and highly magnetic nanoparticles and to methods for separating either a dispersed phase or a dissolved material from a continuous phase, such as water/oil emulsions. The present invention uses particles for the separation of multiphase systems which are reusable for further separation steps.

The principle of this process is explained by way of example on a system where the oily phase is dispersed while the aqueous phase is continuous and the nanoparticles used are non-functionalized: The nanoparticles as described herein collect preferably in the oil droplets of a water/oil mixture or at the phase boundary. The present invention uses particles of sufficiently large oleophilic surface area and of sufficient magnetization properties so that magnetic field gradients can be used to move the particles in a desired direction and the particles will draw the oil droplet along. This results in a net movement of oil droplets towards regions of highest magnetic field gradients. This, in turn, results in a separation of the oil phase from the water phase. The phase boundaries separating the individual droplets can be broken by the moving and agglomerating particles. Since the nanoparticles act as surfactants accumulating on the droplet boundaries, smaller oil droplets, having a larger relative surface area (Table 1) will have a higher particle loading. Therefore due to this movement the oil phase accumulates in regions of high magnetic field gradients leaving the water phase in regions of low magnetic field gradients leading to a separation of the two phases. In a next step or simultaneously through application of a stronger field gradient the particles detach from the oil/water interface and are removed from the oil phase and resulting in the collection/regeneration of the particles as a particle rich slurry, or even solid particle agglomerates which can then be separated and optionally reused. (c.f. FIG. 2)

In a further aspect, the present invention comprises a method of recovering or isolating a lipophilic phase (including oily phase, cells or microorganisms) from an aqueous phase (including water, cell culture media) comprising the steps of: i) mixing highly magnetic, graphene coated, metallic nanoparticles with the phases to be separated, ii) applying a magnetic field gradient, by the use of permanent or electric magnets, to cause a movement of the lipohilic phase to regions of high magnetic field gradient, resulting in a spatial separation of the phases and, optionally iii) followed by or simultaneously applying a stronger magnetic field gradient for the recovery of the magnetic particles from the oil phase resulting in a separation of the magnetic particles from the oil phase which both can be recovered.

By analogy, the same procedure may be applied for diagnostics or in tissue engineering where a specific type of cell or all cells present must be removed from a liquid sample.

In yet another application e.g. for food additive production or in biotechnical production of proteins, viruses, vaccines and antibodies the magnetic functionalization of the cells may be used to keep them afloat in a desired volume of liquid allowing the separation of the liquid, containing a desired product from their site of production (e.g. cells, microorganisms). This application may also be applied in waste-treatment plants.

In yet another aspect of the present invention a solid material dispersed in a liquid phase is separated from other solid materials or just removed from the liquid by preferable absorption or sticking of magnetic particles to its surface and application of a procedure as outlined above, where in step c) the magnetic particles can be collected due to a reversible detection of the magnetic nanoparticles under stronger magnetic field gradients. This application may be preferably used in the separation of metals e.g. ores and in waste recycling.

The mixtures to be separated according to this invention are characterized by two immiscible or slightly miscible fluids where one component is an oleophilic "oil" phase and the other component is a oleophobic "water" phase. The water phase could comprise, but is not limited to, water and aqueous solutions. Since living cells are surrounded by a liquid membrane, they look similar to small oil droplets from the outside. By analogy, the oil droplets of small size (1-100 μm) could also represent living microorganisms or cells. Such cells may be used in a biotechnology reactor (e.g. for pharmaceutical production or food production) or in a water cleaning plant.

The invention further discloses new functionalized nanoparticles and their manufacturing.

DISCLOSURE OF THE INVENTION

Hence, it is a general object of the invention to provide processes and materials that overcome one or more of the disadvantages identified above.

Now, in order to implement these and still further objects of the invention, which will become more readily apparent as the description proceeds, the process for separating a dispersed phase from a continuous phase according to this invention is manifested by the steps of i) contacting said phases with an effective amount of nanoparticles; ii) applying a magnetic field gradient to the obtained system; iii) separating the obtained phases wherein said nanoparticles are of the core shell type, said core consists of a metal or alloy having soft magnetic properties and said shell essentially consist of graphene layers which are optionally functionalized.

The present invention will be described in more detail below. It is understood that the various embodiments, preferences and ranges as provided/disclosed in this specification may be combined at will. Further, depending of the specific embodiment, selected definitions, embodiments or ranges may not apply.

BRIEF DESCRIPTION OF THE DRAWINGS

The invention will be better understood and objects other than those set forth above will become apparent when consideration is given to the following detailed description thereof. Such description makes reference to the annexed drawings, wherein.

MODES FOR CARRYING OUT THE INVENTION

Figure 1:
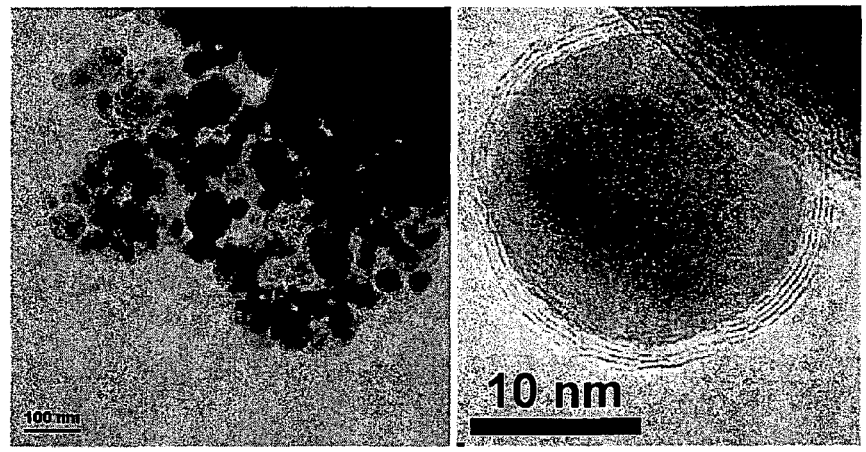
FIG. 1 shows transmission electron micrographs of the carbon coated cobalt nanoparticles obtained according to example 1.1 (Left: small particle size of below 100 nm, and a narrow particle size distribution; Right: carbon coating of the individual cobalt nanoparticles visible)

In a first aspect, the invention relates to a process for separating a dispersed phase or a dissolved material from a continuous phase comprising the steps of i) contacting said phases with an effective amount of nanoparticles; ii) applying a magnetic field gradient to the obtained system; iii) separating the obtained phases; wherein said nanoparticles are of the core shell type, said core consists of a metal or alloy having soft magnetic properties and said shell essentially consists of graphene layers which are optionally functionalized.

The invention generally relates to separation processes. In one embodiment, poly- or biphasic systems are separated, wherein one or more dispersed phases (preferably one dispersed phase) and a continuous phase are present while in a further embodiment, the invention relates to the separation of dissolved material from a single phase ("monophasic systems"). Consequently, the invention therefore relates to A) A Process for separating a dispersed phase from a continuous phase according to claim 1 or 2, comprising the steps of i) contacting said phases with an effective amount of nanoparticles; ii) applying a magnetic field gradient to the obtained system; iii) separating the obtained phases wherein said nanoparticles are of the core shell type, said core consists of a metal or alloy having soft magnetic properties and said shell contains one or more graphene-layers which are optionally functionalized and B) A Process for separating dissolved material from a continuous phase comprising the steps of i) contacting said phase with an effective amount of nanoparticles; ii) applying a magnetic field gradient to the obtained system; iii) separating the obtained phases wherein said nanoparticles are of the core shell type, said core consists of a metal or alloy having soft magnetic properties and said shell contains one or more graphene-layers which are functionalized.

Biphasic systems: The terms dispersed phase and continuous phase are known in the field. In the context of this invention, any system comprising at least two phases is included. The larger phase is considered the continuous phase, while one or more further phases are considered dispersed. For the avoidance of doubt, an oily phase on top of an aqueous phase (e.g. in the case of oil pollution) shall be regarded as dispersed and continuous phase as well. The process according to this invention is used where the continuous phase is a hydrophilic ("aqueous") phase, while the dispersed phase is a lipohilic ("oily") phase. The term lipohilic phase is known in the field, it includes phases that are liquid and lipohilic (e.g. mineral oils, crude oil, paraffin oil, bituminous oil, (mixtures of) alkanes, vegetable oils and its mixtures) and also phases that are solid and lipophilic (e.g. lipohilic minerals, microorganisms, cells). In this embodiment, it is advantageous to use nanoparticles that are un-functionalized on the graphene shell to obtain lipophilic particles. In an alternative embodiment, the process according to this invention is used where the continuous phase is a lipohilic phase, while the dispersed phase is a hydrophilic phase. In this embodiment, it is advantageous to use nanoparticles that are functionalized on the graphene shell to obtain hydrophilic particles, such functionalization is described below.

Monophasic systems: The terms dissolved material and continuous phase are known in the field. In the context of this invention, the dispersed phase may be polar or apolar. Suitable continuous phases show a viscosity between $10^{-4}$ to 2 Pa s. Continuous phases may be polar or apolar; preferred are polar phases, such as water containing ("aqueous") phases. The dissolved material may be basically any material and includes i) heavy metal ions such as Hg, Cd, Cr, Cu; mono- or poly-nucleic acids such as DNA and RNA, mono- and poly-amino acids such as proteins, natural and synthetic carbohydrates such mono- and poly-saccharides. In this embodiment, it is advantageous to use nanoparticles that are functionalized on the graphene shell to obtain improved binding properties towards the dissolved material, such functionalization is described below.

Figure 2:
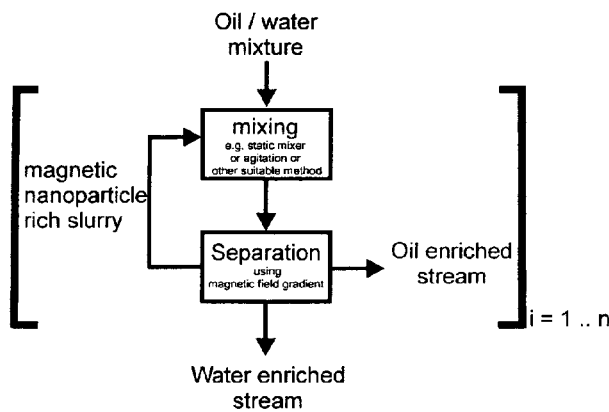
FIG. 2 shows a process scheme for the separation of oil/water mixtures by the use of carbon coated magnetic nanoparticles (the steps can be repeated to achieve a higher degree of separation)

The term "separating" refers to a partial or complete separation of the two phases. In case of an incomplete/insufficient separation, one or more additional separation steps may be added. This is illustrated in FIG. 2 (i>1)

The term "contacting" refers to any suitable way of contacting the nanoparticles as described herein with the phases to be separated. Thus, it includes a simple addition of nanoparticles as well as intense mixing. Depending on the circumstances, a mixing is not possible (e.g. in case of oil pollution) or only specific mixers may be applicable (e.g. in case of polymerization or handling of biological cells).

The amount of nanoparticles to be used depends on the whole process and can be determined in simple experiments. Various parameters, such as viscosity, nature or nanoparticles, degree of separation aimed and separation time depend on the amount of nanoparticles to be used. This situation is reflected by choosing the language "effective amount". Typically, the mass of nanoparticles required is in the range of 1/100 to 1000-fold, preferably 1/100 to 100-fold, the mass of dispersed phase present.

The magnetic field gradient to be applied may vary in a broad range and can be established by known methods, e.g. a permanent magnet or a wire conducting current. To "apply" a magnetic field means to influence the obtained system of continuous phase, dispersed phase and nanoparticles by a magnetic field. The magnetic field applied to the system may be a constant field ("static") or a time dependent field ("dynamic"), as the specific process requires. The following considerations are useful to determine the magnetic field gradients to be applied:

The separation of oil-water emulsions by buoyancy forces with small oil droplets and low density difference between the oil and water phase is only very slow, caused by the strong dependence of the droplet size on the migration velocity of the droplet and can be calculated according to the following equation (assuming Stokes law, Reynolds number of the droplet<1):

$$v_{rise} = \frac{2 \cdot g \cdot \Delta\rho \cdot r_{oil}^2}{9 \cdot \mu}$$

where g is the gravitational acceleration constant, βρ is the density difference, μ is the viscosity of the suspending medium and $r_{oil}$ is the radius of the droplet. Therefore these droplets have to be separated from the water phase by other, e.g. magnetic, forces. For examples and the dependence of the droplet diameter on the rise velocity see Table 1.

TABLE 1

Influence of the droplet size (oil density: 900 kg/m³) on the droplet separation speed from water (density: 1000 kg/m³, viscosity: 0.001 Pa s)

| Droplet diameter | Boyancy uplift velocity (m/s) | Specific droplet surface area (m²/m³ oil) |
|---|---|---|
| 1 μm | $5.5 \cdot 10^{-8}$ | $6.0 \cdot 10^6$ |
| 5 μm | $1.4 \cdot 10^{-6}$ | $1.2 \cdot 10^6$ |
| 10 μm | $5.5 \cdot 10^{-6}$ | $6.0 \cdot 10^5$ |
| 50 μm | $1.4 \cdot 10^{-4}$ | $1.2 \cdot 10^5$ |
| 1 mm | $5.5 \cdot 10^{-2}$ | $6.0 \cdot 10^3$ |

The force of a magnet acting on the ferro-magnetic particles along a coordinate x can be calculated as (G. Formum et al. *J. Magnetism and Magnetic Mater,* 293, 41-47, 2005):

$$F_{mag} = M(B) \cdot G \cdot m$$

where m is the mass of the particle, M(B) is the mass magnetization and G is the magnetic field gradient in the x-direction. Examples of the force acting on nanoparticles are shown in Table 2.

TABLE 2

Influence of particle size on particle mobility (mass magnetization: 30 A m²/kg; magnetic field gradient: 100 T/m; particle density: 9000 kg/m³; medium viscosity: 0.001 Pa s; assuming spherical droplets and room temperature).

| Particle diameter | Magnetic force on particle pN | Diffusion coefficient m²/s | SSA for ligand connection or oil binding m²/kg |
|---|---|---|---|
| 20 nm | $1.1 \cdot 10^{-4}$ | $2 \cdot 10^{-11}$ | $3.3 \cdot 10^4$ |
| 100 nm | $1.4 \cdot 10^{-2}$ | $4 \cdot 10^{-12}$ | $6.7 \cdot 10^3$ |
| 500 nm | 1.8 | $8 \cdot 10^{-13}$ | $1.3 \cdot 10^3$ |
| 2 μm | 110 | $2 \cdot 10^{-13}$ | $3.3 \cdot 10^2$ |

Assuming that the carbon coated nanoparticles homogeneously coat the oil droplets at the oil/water interface the buoyancy and magnetic forces acting on the oil droplets can be calculated using the following equations:

Boyancy–Gravitational force:

$$F_{nomag} = \Delta\rho \cdot g \cdot V = \Delta\rho \cdot g \cdot \frac{4}{3} \cdot \pi \cdot r_{oil}^3$$

where Δρ is the difference in gravity between the water and oil phase, g is the gravitational constant (9.81 m/s²), and $r_{oil}$ is the radius of the oil droplet.

The mass of magnetic particles coating an oil droplet assuming a homogeneous monolayer can be calculated as:

$$m_{layer} = \frac{A_{oil}}{A_p^{square}} \cdot m_p = \frac{r_{oil}^2 \cdot \pi \cdot 4}{(2 \cdot r_p)^2} \cdot r_p^3 \cdot \pi \cdot \frac{4}{3} \cdot \rho_p = \frac{4}{3} \cdot \rho_p \cdot \pi^2 \cdot r_{oil}^2 \cdot r_p$$

where $A_{oil}$ is the surface area of an oil droplet of radius $r_{oil}$, $A_p^{square}$ is the projected surface area of a square encasing a magnetic particle of radius $r_p$, mass $m_p$ and density $\rho_p$.

The magnetic force acting on the droplet can then be calculated as:

$$F_{mag} = M(B) \cdot G \cdot \frac{4}{3} \cdot r_{oil}^2 \cdot r_p \cdot \rho_p \cdot \pi^2$$

where M(B) is the mass magnetization of the magnetic particles and G is the magnetic field gradient (T/m).

The rise velocity of the droplet under a given force can be calculated assuming steady state conditions, spherical particles and laminar flow at given medium viscosity, μ, as:

$$v_{rise} = \frac{F_x}{r_{oil} \cdot 6 \cdot \pi \cdot \mu}.$$

Therefore the rise velocity under a given magnetic field gradient and the rise velocity due to buoyancy can be calculated as:

$$v_{mag} = \frac{2 \cdot M(B) \cdot G \cdot r_p \cdot \rho_p \cdot \pi}{9 \cdot \mu} \cdot r_{oil}$$

$$v_{buoy} = \frac{2 \cdot \Delta\rho \cdot g}{9 \cdot \mu} \cdot r_{oil}^2$$

showing that the rise velocity under magnetic applied forces has a weaker dependence on the oil radius (linear instead of cubic dependence). Examples of the forces acting from a magnet and from solely buoyancy as well as the corresponding separation velocities are shown in Table 3. This clearly indicates the strong favorable use of magnetic field gradients and magnetic particles. It further shows that the magnetization of the particles is very important for efficient separation.

ized. (c.f. FIG. 1). Some of these nanoparticles (with no functionalization or with some specific functional groups) are known or obtainable according to known methods e.g. Grass and Stark, Journal of Materials Chemistry 16, 1825-1830, 2006. (addition of acetylene as reactive gas resulting in the carbon coating of the described metallic particles) or as described in U.S. Pat. No. 5,547,748 using the appropriate starting materials.

The shell of carbon has a structure identical or similar to graphene layers. Due to its size the shells are sometimes also characterized as "Super-Buckminster-fullerenes". Choosing the term "graphene" indicates that the carbon atoms are predominantly (or almost exclusively) present in the sp2-hybridization state without additional atoms bound. Further advantageous embodiments of said shell are explained below.

In an advantageous embodiment, the nanoparticles used in this process have a volume-surface-average diameter as evaluated by nitrogen adsorption using the BET method (according to: Janssen, Zirkzee, German and Maxwell, Journal of Applied Polymer Science 52, 1913, 1994) of below 200 nm, more preferably below 100 nm and most preferably below 50 nm.

In an advantageous embodiment, the nanoparticles used in this process are coated by graphene layers of a thickness between 0.3 and 10 nm, particular preferably 1-5 nm (as evaluated from transmission electron micrographs, ~1-50 graphene layers). This results in a carbon content (as measured by quantitative microanalysis using a LECO-900) of between 0.5 and 20% wt. This carbon coating thickness sufficiently protects the metal core from oxidation, provides optimal oleophilic surface properties and does not adversely affect the magnetic properties of the core.

In an advantageous embodiment, the nanoparticles used in this process have a core diameter of 10-1000 nm, preferably 10-200 nm particular preferably 20-100 nm. This size of the core ensures good magnetic properties and high surface area for adhesion to the dispersed phase.

TABLE 3

Influence of the droplet diameter on the forces acting on the particles and corresponding steady state rise velocities calculated for these forces. (assuming spherical droplets where the magnetic particles (40 nm diameter)

| Droplet diameter | Buoyancy force (pN) | Magnetic force at 10 T/m (pN) | Magnetic force at 100 T/m (pN) | Rise velocity buoyancy (mm/s) | Rise velocity magnetic at 10 T/m (mm/s) | Rise velocity magnetic at 100 T/m (mm/s) |
|---|---|---|---|---|---|---|
| 1 μm | $5 \cdot 10^{-4}$ | 0.2 | 1.8 | $5.5 \cdot 10^{-5}$ | 0.02 | 0.2 |
| 5 μm | $6 \cdot 10^{-2}$ | 4.4 | 44 | $1.4 \cdot 10^{-3}$ | 0.09 | 0.9 |
| 10 μm | $5 \cdot 10^{-1}$ | 18 | 180 | $5.5 \cdot 10^{-3}$ | 0.18 | 1.8 |
| 50 μm | 6 | 440 | 4400 | 0.1 | 0.9 | 9 |
| 1 mm | 500'000 | 180'000 | 1'800'000 | 5.5 | 18 | 180 | homogeneously coat the droplet surface at a surface concentration of $6.25 \cdot 10^{14}$ particles per m$^2$; particle density: 9000 kg/m$^3$; density difference between oil and water: 100 kg/m$^3$; mass magnetization: 30 A m$^2$/kg; water viscosity: 0.001 Pa s) for two assumed magnetic field gradients.

After separation of dispersed and continuous phase by means of magnetic nanoparticles in a magnetic field, the obtained phases may be separated by any convenient means, such as a decanter. Other devices may also be useful for separating the obtained phases.

The nanoparticles used for the process according to this invention are a key element; they possess soft magnetic properties and either a lipophilic or hydrophilic surface. Suitable nanoparticles have a saturation magnetization of at least 80 A m$^2$/kg, are of the core shell type, said core consists of a metal or alloy having soft magnetic properties and said shell is formed by graphene layers which are optionally functional- In an advantageous embodiment, the particle diameters of the nanoparticles used in this process have a maximum geometric standard deviation $\sigma_g < 1.6$. This uniform size distribution simplifies handling and improves separation properties.

In a further advantageous embodiment, the present invention comprises the use of carbon coated metal nanoparticles with a high thermal stability resulting in a weight change of <5% by oxidation in air at ambient pressure at temperatures below 100° C., more preferably below 200° C. and most preferably below 230° C.

In a further advantageous embodiment, the present invention comprises the use of particles with soft magnetic properties, preferably superparamagnetic properties. Such particles can easily be dispersed in a liquid phase in the absence of strong magnetic field gradients. The term "soft magnetic" denotes ferromagnetic properties with a coercive force below 30,000 A/m, preferably below 16,000 A/m. In an ideal case, the coercive force is zero, resulting in a superparamagnetic material.

In a further advantageous embodiment, the present invention comprises the use of carbon coated metal nanoparticles with a saturation magnetization (as defined by: E. Riedel, *Anorganische Chemie*, 4. Auflage, Waltrede Gruyter, N.Y., 1999, evaluated at a magnetic field of 2.0 Tesla at application temperature) of above 80 A m$^2$/kg, more preferably above 100 A m$^2$/kg, most preferably above 120 A m$^2$/kg.

In a further advantageous embodiment, the present invention comprises the use of carbon coated metal nanoparticles with a low coercivity (as defined by: E. Riedel, *Anorganische Chemie*, 4. Auflage, Waltrede Gruyter, N.Y., 1999, at application temperature) of below 30,000 A/m, preferably below 16,000 A/m, more preferably below 12,000 A/m and most preferably below 8,000 A/m.

In a further advantageous embodiment, the present invention comprises the use of nanoparticles wherein the shell of said nanoparticles consists of graphene layers which are not further functionalized. Such nanoparticles show very good hydrophobic properties, are easy to manufacture and available at low costs. Thus, it is possible to use such particles where recovery/recycling are not possible or not desired.

In a further advantageous embodiment, the present invention comprises the use of nanoparticles wherein the shell of said nanoparticles consists of graphene layers which are functionalized with one or more functional groups selected from the group of amines, hydroxy, carboxy, ethers, ketones, epoxides, nitro, sulfonyl, halogen (—Cl, —Br, —F, —I). For example, the shell may be derivatized with hydroxyl groups by treatment with periodate or by ozonolysis. Alternatively, the shell may be derivatized to contain epoxides on their surfaces by exposing them to oxygen (Hoke, et al., *J. Org. Chem.*, 57, 5069, 1992; Wood, et al., *J. Am. Chem. Soc.*, 113, 5907, 1991; Kalsback, et al., *J. Electroanal. Chem.*, 314, 363, 1991; Diederich, et al., *Science*, 252, 548, 1991; Taylor, et al., *J. Chem. Soc. Perkin Trans.*, 2, 3, 1992; Tuinman, et al., *J. Phys. Chem.*, 96, 7584, 1992). Epoxides can be converted to form ethers using heat or ultraviolet light. Oxidation of the shell can be accomplished, for example, by heating nanoparticles as described herein in the presence of oxygen, carbon dioxide or carbon monoxide. Amine derivatives (Wudl et al., *Fullerenes: Synthesis, Properties and Chemistry*, American Chemical Society, 1992) including primary amines, may be generated by reacting the nanoencapsulates with an amine. Nanoparticles and n-propylamine may be mixed and reacted at room temperature to allow the reaction to proceed. Other amine containing reagents can be used as well (for example, dodecylamine, morpholine, t-butylamine, ethylenediamine). Grignard and organolithium reagent additions may also be carried out (Wudl et al., *Fullerenes: Synthesis, Properties and Chemistry*, American Chemical Society, 1992). The surfaces of the nanoparticles may be derivatized to contain halogens (preferably Cl, Br) as well (Tebbe et al., *J. Am. Chem. Soc.*, 113, 9900, 1991; Olah et al., *J. Am. Chem. Soc.*, 113, 9385, 1991; Birkett et al., *Nature*, 357, 479, 1991; Tebbe et al., *Science*, 256, 882, 1992). Halogen derivatives are very useful intermediates in organic syntheses. Further, diazotation reaction may result in graphene shells with functional groups, in particular in substituted phenyls; the substituents selected from the group of amines, hydroxy, formyl, ethers, ketones, carboxylic acids and esters. (c.f. examples). A functionalization may be advantageous to influence the surface properties of the nanoparticles as disclosed herein to improve the separation process. Therefore the use of carbon coated magnetic nanoparticles with small particle size, low coercivity and high saturation magnetization which have been surface modified by the addition of specific functional groups or larger organic functionalities in a process as described herein is encompassed. Such functionalized nanoparticles may be used in the separation process as described above, in particular to target specific dispersed phases or to improve separation properties.

The atoms in the carbon layers have a sp$^2$ ordering which can react e.g. with strong acids, carbocations or diazonium salts. After functionalization the carbon coated, magnetic nanoparticles can be used as reagent for a large range of organic chemical reactions such as esterification, peptide condensation, Heck, Suzuki, Sonogashira, Grignard reactions amongst many others. Thus, the present invention relates to the use of functionalized magnetic nanoparticles as described herein in chemical reactions comprising the group of esterification, peptide condensation, Heck-, Suzuki-, Sonogashira-, Grignard-reactions. The functionalized particles can also be used as magnetic beads for catalytical, medical, biological and water treatment applications. Thus, the invention relates to the use of functionalized magnetic nanoparticles as described herein as magnetic beads for catalytical, medical, biological and water treatment applications.

In a further embodiment the obtained functionalized nanoparticles as described above can be further derivatized, using standard coupling reaction chemistry, to couple the nanoencapsulates and a molecule or compound of interest: for example, amino acids, peptides, polypeptides, enzymes, ribosomes, drug molecules, antibodies, avidin, biotin, nucleic acids, polymer monomers and polymers. An exemplary coupling reaction involves the use of N-hydroxysuccinimide (NHS) homobifunctional crosslinking reagents (Pierce, Rockford Ill.). The reagents react with primary amine functional groups. In the neutral to alkaline pH range the amino group reacts with the NHS ester to form a stable, amide bond.

In an advantageous embodiment the present invention relates to a process for separating a dispersed phase from a continuous phase comprising the steps of i) contacting said phases with an effective amount of nanoparticles as described herein; ii) applying a magnetic field gradient to the obtained system; iii) separating the obtained phases; iv) applying a magnetic field gradient or a chemical cleavage reaction to the phase containing the nanoparticles; v) separating said nanoparticles from the remaining phase and vi) optionally recycling the separated nanoparticles to step i). Steps i), ii) and iii) are already explained in detail in this specification.

Step iv) aims to separate the nanoparticles used in the process. For this purpose, the applied magnetic field gradient needs to be stronger than the adhesive forces between nanoparticles and dispersed phase. Thus, the magnetic field in step iv) is stronger than in step ii), for example 2 to 10 times stronger. Alternatively, a chemical cleavage reaction may be applied. This is particular suitable for processes, wherein dissolved material is separated from a continuous phase. In such process, often a strong chemical bond (e.g. a covalent bond or an ionic bond) is formed. Suitable cleavage reactions depend on the nature of the bond between functionalized nanoparticles and separated material and are known in the field and include hydrolysis, acid-base reactions, salt forming reactions.

Step v) aims to separate the dispersed phase from the magnetic nanoparticles; any known method may be applied in this step. The nanoparticles recovered may be used for a further separation step or disposed.

The process for separating a dispersed from a continuous phase as described herein finds application/use in all kinds of industry. Such applications/uses relate to polyphasic/biphasic systems as well as to mono-phasic systems. For example, such applications can be found in a. oil production
b. petrochemistry
c. treatment of oil spills
d. in recovery and processing of lubricant slurries
e. treatment of bilge waters in ships,
f. treatment of washing waters
g. commercial water treatment (e.g. of park-houses, car shops, car washing plants or bays)
h. treatment of industrial waste water streams
i. water desalination and/or water treatment
j. in recovery and separation of color dispersion
k. mining and ore recovery
l. reaction aid in emulsion polymerization
m. reaction aid in organic synthesis
n. reaction aid in pharmaceutical production
o. reaction aid in diagnosis
p. manufacturing of metal or polymer parts (e.g. automotive industry).

Applications/use a-f may be summarized as mineral oil treatment processes. Thus, the invention relates to a mineral oil treatment process comprising the process steps as described herein. It further relates to the use of nanoparticles (preferably to nanoparticles where the graphene layers is not functionalized) as described herein in a mineral oil treatment process.

Applications/use g-i may be summarized as water treatment processes. Thus, the invention relates to a water treatment process comprising the process steps as described herein. It further relates to the use of nanoparticles as described herein in a water treatment process.

The invention further relates to a mining and ore recovery process comprising the process steps as described herein. It further relates to the use of nanoparticles as described herein in a mining and ore recovery process.

Applications l-o may be summarized as (bio)chemical reactions. Thus, the invention relates to a biochemical or chemical reaction comprising the process steps as described herein. It further relates to the use of nanoparticles as described herein in a biochemical or chemical reaction.

The applications as identified above are further explained in detail below.

a. oil production: The process as described herein is in particular useful for enhanced and/or facilitated water/oil separation during oil recovery or exploitation, e.g. where water is injected in an oil field at elevated pressure to wash out oil remainders from oil fields. Nanoparticles as described herein may be added in the water stream, be pumped down into the oil field and facilitate the removal of the oil from uprising slurry/emulsion. The magnetic field gradient for oil/water separation ("step ii" as defined herein) may be applied on an oil rig or ~platform or be submerged within a borehole and be applied underground. Preferably, such systems should be fitted into a slim cylindrical form of less than 1 meter diameter. The water effluent of the oil recovery can be subjected to an additional oil recovery step as outlined above. In an advantageous embodiment, the required pumps and magnetic separator unit are combined and operated underground. Thus, the present invention relates to the use of nanoparticles in oil production.

b. petrochemistry: The process as described herein may be useful in the reactions/processes that take place in an oil refinery. In particular, the process as described herein may be used for drying of oil by removing water droplets dispersed in the oil. In this embodiment, it is advantageous to use nanoparticles which are functionalized with hydrophilic groups, such as OH, NH2, SO3H, COOH and the like on the graphene shell.

c. Oil Spills: Nanoparticles as described herein may be used for removal and clean up of oil spills. In one embodiment nanoparticles are distributed over floating oil (e.g. by means of a ship or aircraft vehicle). In a second step, magnetic collection devices (such as electromagnets) are used to scan the surface of the water which results in the recovery of the oil.

f. treatment of washing water: In this embodiment, polluted water (e.g. from washing oil tanks and oil treating equipment, pipes, car engine blocks . . . ) is subject to a process as described herein. In an advantageous embodiment, nanoparticles without further functionalisation are used in such process. Thus, the invention also relates to the use of nanoparticles as described herein in the treatment of washing waters.

i. Water desalination: In this embodiment, the nanoparticle surface is modified with a chelating/complexing agent as to selectively remove specific salts or ions or metals. More specifically nanoparticles may be functionalized with derivatives of nitrilotriacetate, EDTA or similar chelating compounds. This allows for removal of metals such as iron or manganese (to improve taste) for the removal of heavy metals such as arsenic, barium, beryllium, selenium, thallium, chromium, lead, vanadium, nickel, copper, cadmium, quicksilver, aluminum, radioactive isotopes (to improve water quality/reduce toxicity). Specifically, such application may involve the removal of indium from aluminum treating or manufacturing plants. Here the dissolved ions can be regarded as a "distributed phase" in the "continuous" water phase.

k. mining and ore recovery: The process as described herein is also useful for solid/solid separation out of a slurry. In this process, the dispersed phase in a solid. Accordingly the invention relates to a process for separating ore comprising the steps of suspending finely grounded ore/stone in an aqueous solution and subjecting the obtained slurry to a process as described herein. Due to the different hydrophilic/lipophilic properties of ore/stone, the nanoparticles adhere specifically and may be separated accordingly. Thus, the invention also relates to the use of nanoparticles as disclosed herein in mining and ore recovery.

l. Emulsion polymerization: Emulsion polymerization is a known and well-established process in industry. An open issue in this process is the recovery of the formed polymer from the reaction mixture. The integration of a process as described above into an emulsion polymerization may significantly improve said process. Thus, the invention also relates to a process of emulsion polymerization comprising the step of adding nanoparticles as described herein during or after polymerization, applying a magnetic field gradient to the obtained composition and separating the obtained polymer (which also contains the nanoparticles). This process allows easy separation of polymers from the reaction mixture.

m. Organic synthesis: To enable reactions run in two systems and rapid phase separation (phase-transfer reactions). Such processes may specifically involve oxidation of organic substances by hydrogen peroxide, oxygen under pressure and biological and enzyme catalyzed reactions, where on or several constituents of the reaction and/or the enzyme is of poor water or oil solubility.

Figure 3:
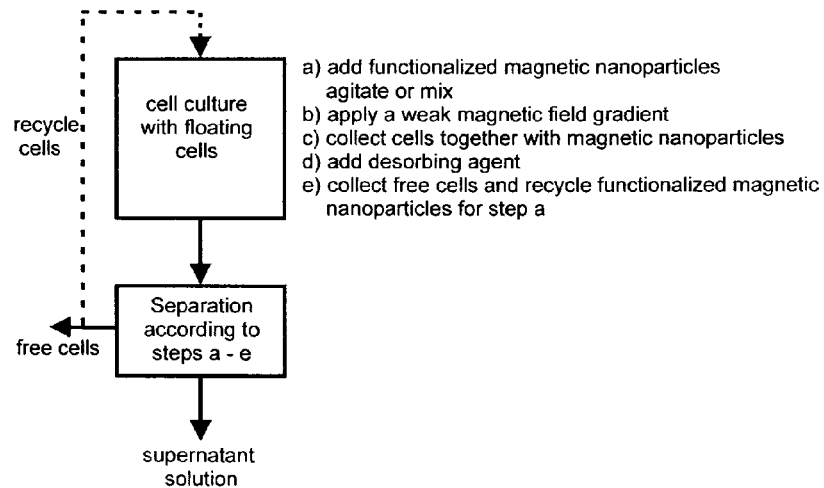
FIG. 3 shows a process scheme for the separation of cells from a cell medium by the use of carbon coated magnetic nanoparticles which may be functionalized.
Figure 4:
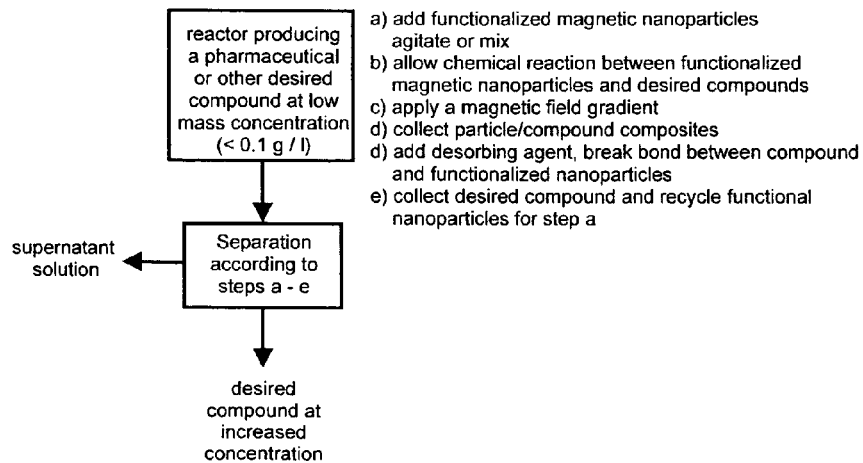
FIG. 4 shows a process scheme for the separation of a pharmaceutical from a reaction medium (e.g. fermentation medium) by the use of carbon coated magnetic nanoparticles which may be functionalized.

For biological/medical applications the nanoparticles as described herein are functionalized with reactive groups (such as —COOH, —OH or $NH_2$ groups and others) which are capable in reacting with biological molecules (such as proteins (including antibodies, peptides), enzymes, nucleic acids (including DNA, RNA)) resulting in one or more chemical bonds (e.g. a covalent bond) between the nanoparticles and the biological molecule. Using magnetic forces, the molecule/particle compounds can be moved, agitated or displaced in the medium or separated from the medium. If necessary, the bond between the particle and molecule can be broken by standard organic-chemical or biochemical (e.g. by an enzyme) methods, leading to a purification of the desired molecule and to reusable magnetic particles. Depending on the reaction conditions, such reactions may be homogeneous (monophasic) or heterogeneous (bi- or poly-phasic). Thus, the present invention relates in a further aspect to the use of nanoparticles in chemical/biochemical reactions of biological molecules.

n. Pharmaceutical production: The process as described herein may be useful for the collection of a specific product out of a low concentrated solution (mono-phasic) or dispersion (bi- or polyphasic). The process as described herein may also be useful in the operation of bioreactors to keep a group of cells or microorganisms inside a confined volume while a liquid slowly flows through the cell suspension. The process as described herein may also be useful for the collective collection of proteins/virus/dna, antibodies products. In these applications, it is advantageous to use magnetic nanoparticles that are functionalized as to selectively recognize the desired target compound.

o. Diagnostics: The process as described herein may be useful for the collection/separation and recognition of specific proteins/viruses, DNA/RNA, carbohydrates, antibodies from a tissue sample/blood sample, saliva, glucose liquid, urine, plasma or other body fluids (e.g. spinal liquid, lymph liquid) and homogenized tissue samples. Here, a specific advantage of the present invention in the rapidity and efficiency of the collection that is based on the high mobility of the here used small, yet highly magnetizable particles. Due to their high saturation magnetization and low coercivity, the nanoparticles can be rapidly distributed in a liquid sample where they scan the whole liquid by Brownian diffusion, yet they are rapidly collected if a magnetic field gradient is applied. Thus, the invention also relates to a process of analyzing and/or separating a compound selected from the group of proteins/viruses, DNA/RNA, carbohydrates, antibodies ("dispersed phase") in an aqueous solution, body fluid or homogenized tissue sample ("continuous phase") comprising the steps of i) contacting said phases with an effective amount of nanoparticles as described herein; ii) applying a magnetic field gradient to the obtained system; iii) separating and analyzing the obtained phases. Further, the present invention relates to the use of nanoparticles as described herein for the separation of DNA, RNA, proteins, biological cells and antibodies from mixtures, for the immobilization of drugs, catalysts and enzymes which can be manoeuvred and displaced by magnetic forces. (c.f. FIGS. 3 and 4).

In a second aspect, the invention relates to nanoparticles of the core shell type, wherein said core consists of a metal or alloy having soft magnetic properties and said shell contains one or more graphene layers which are functionalized by one or more of the groups according to formula (I):

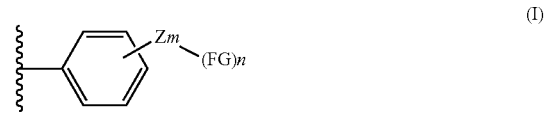

wherein
m is an integer between 0 and 20
n is an integer between 1 and 5
Z represents a spacer selected from the group of alkyl, alkenyl, alkyloxy, amino acids and saccharides and
FG represents independent from each other OH, OR, $NO_2$, $NH_2$, NHR, $NR_2$, COH, COR, COOH, COOR, $SO_2$, SOR, $SO_2R$, halogen, P(O)OH, P(O)OR, $P(O)_2OH$, $P(O)_2OR$
R represents $C_1$-$C_4$alkyl, $C_1$-$C_4$alkoxy, $C_3$-$C_{10}$cyclo-alkyl, $C_4$-$C_{10}$ aryl,
    or a 5-membered heterocycle containing at least one atom selected from the group of N, O, S
    or a 6-membered heterocycle containing at least one atom selected from the group of N, O, S
    or a metal chelating group selected from the group consisting of polycarboxylic acids, polyamides, polyamides, aminoacids, polyaminocarboxylates, polyamines, polysulfides;
and its salts.

These nanoparticles are new and subject to the present invention, and are schematically depicted in FIG. 9. They are useful, e.g. in the processes as described herein and may be manufactured as disclosed below ("third aspect").

Advantageous embodiments of these new nanoparticles are provided below:

In an advantageous embodiment, n represents 1 and FG is in the para-position.

In a further advantageous embodiment, n represent 2 and FG is in the meta positions.

In a further advantageous embodiment, FG represents halogen.

In a further advantageous embodiment, R represents a metal chelating group selected from the group consisting of polycarboxylic acids (e.g. succinic acid), polyamides, aminoacids, polyaminocarboxylates (e.g. EDTA, DTPA, EDDS), polysulfides, polyamines (e.g. spermine, polyethyleneimine).

In a further advantageous embodiment, the spacer Z is not present, i.e. m represents zero. This may be advantageous if low-cost nanoparticles are required, for example in waste water treatment or ore refinement.

In a further advantageous embodiment, the spacer Z is present, i.e. m represents an integer between 1 and 20, preferably between 2 and 10. This may be advantageous to improve specific binding between nanoparticle and dispersed phase. Such spacers are known to the skilled person and may be selected according to the need of the specific process. Suitable spacers are specified below:

If Z represents alkyl, linear and branched alkyls of 1-4 carbon atoms, such as (—CH2-)m, (_—CH(CH3)-CH2-)m are preferred.

If Z represents alkenyl, vinyl or allyl, oligomers are preferred.

If Z represents alkoxy, oligomers of ethylene oxide or propylene oxide are preferred.

If Z represents amino acids, natural occurring alpha-amino acids are preferred. Suitable are, for example, naturally occurring peptides.

If Z represents a saccharide, commercially available hexoses and pentoses are preferred.

If m represents an integer between 2 and 20, preferably between 2 and 10, the group Z may be identical (e.g. polymethylene) or different, but from the same class as (e.g. different aminoacids).

In the context of this invention, salts of the inventive nanoparticles are such nanoparticles wherein FG forms a salt. This includes such nanoparticles wherein FG represents $NR_3^+X^-$ and $PR_3^+X^-$ wherein R is as defined above and X is any suitable anion, in particular halogen, $OH^-$, $SO_4^{2-}$, $SO_3^{2-}$, $NO_3^-$, $NO_2^-$, $CO_3^{2-}$, $HCO_3^-$.

In a further advantageous embodiment, the nanoparticles have a core diameter of 10-1000 nm and a shell thickness of 0.3-10 nm, preferably 10-200 nm and a shell thickness of 0.3-10 nm.

In a further advantageous embodiment, the maximal geometric standard deviation $\sigma_g$ of said nanoparticles is smaller than 1.6.

In a further advantageous embodiment, the nanoparticles have a saturation magnetization of at least 80 A m²/kg.

In a further advantageous embodiment, the nanoparticles have a coercivity of below 30,000 A/m, preferably below 16,000 A/m.

In a further advantageous embodiment, the core of said nanoparticles contains Fe, Co, Ni or its alloys.

The functional groups (FG) may account for 0.1 to 30 wt %, preferably 0.1 to 10 wt % of the total weight of the functionalized nanoparticle, and depend on the weight of the FG and the intended use of the functionalized nanoparticle.

Typically, the compound of formula (I) has a molecular weight of below 10000 g/mol, preferably between 90-1000 g/mol.

In a third aspect, the invention relates to the manufacture of nanoparticles of the core shell type, wherein said core consists of a metal or alloy having soft magnetic properties and said shell contains a graphene layers which are functionalized by one or more of the groups according to formula (I):

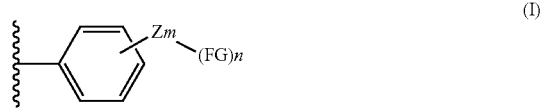

(I)

wherein m, n, Z and FG are as defined above, comprising the step of reacting a nanoparticle of the core shell type, wherein said core consists of a metal or alloy having soft magnetic properties and said shell contains graphene layers with a diazo-compound of formula (II)

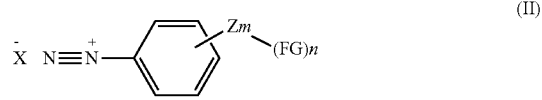

(II)

wherein x represents a suitable anion, such as a halogen (e.g. Cl—) or a weakly coordinating anion (e.g. $BF_4$—).

optionally in the presence of a diluent and optionally in the presence of a reaction aid.

The compound of formula (II) may be added or in situ formed from the corresponding amine using a diazotation reaction. Compounds of formula (II) are known or obtainable according to known methods.

Nanoparticles of the core shell type, wherein said core consists of a metal or alloy having soft magnetic properties and said shell contains graphene layers are known or may be obtained according to known methods.

The ratio of nanoparticles:compound of formula (II) may vary in a broad range (number:number), typically 1:0.5 to 1:50; e.g. 1:5 are suitable.

In a fourth aspect, the invention relates to the use of nanoparticles as described herein in an oil treatment processes, a water treatment process or as reaction aid. In particular, the invention relates to the use of nanoparticles as described herein in a process relating to
a. oil production
b. petrochemistry
c. treatment of oil spills
d. in recovery and processing of lubricant slurries
e. treatment of bilge waters in ships,
f. treatment of washing waters (e.g. from washing oil tanks and oil treating equipment, pipes, car engine blocks . . . )
g. commercial water treatment (e.g. of park-houses, car shops, car washing plants or bays)
h. treatment of industrial waste water streams
i. water desalination and/or water treatment
j. in recovery and separation of color dispersion
k. mining and ore recovery
l. reaction aid in emulsion polymerization
m. reaction aid in organic synthesis
n. reaction aid in pharmaceutical production
o. reaction aid in diagnosis
p. manufacture of metal or polymer parts (e.g. automotive industry);

Further details for such processes and applications are provided above.

In a further embodiment, the invention relates to the use of nanoparticles as disclosed herein (in particular to nanoparticles as disclosed in the second aspect) in biological and biochemical applications. Biochemical application include i) the separation of DNA, RNA, proteins, enzymes, viruses, bacteria and/or cells ("dispersed phase") from a fluid (continuous phase), ii) the synthesis of pharmaceutical including the step of separation of a desired compound (such as a pharmaceutical ingredient, protein, polysaccharide, antibody, nucleic acid, enzyme or toxin) from a liquid phase. This use is in particular suitable, if the dispersed phase/dissolved material is present at low concentration.

In a further embodiment, the invention relates to the use of nanoparticles as disclosed herein (in particular to nanoparticles as disclosed in the second aspect) in diagnostic and clinical medicine and biological detection. In this embodiment, the nanoparticles serve as an efficient reagent carrier that can be rapidly distributed or removed from a detection volume thus allowing separation and a more efficient and less time consuming detection of a toxin, disease specific molecular biological marker or a desired nucleic acid sequence.

In a further embodiment, the invention relates to the use of nanoparticles as disclosed herein (in particular to nanoparticles as disclosed in the second aspect) in the treatment of contaminated water (e.g. during waste water treatment) or in the preparation of drinking water or in the preparation of process water (e.g. for industrial usage). In this embodiment, the nanoparticles of this application are preferably covered with functional groups that include chelating agents for heavy metal removal or suitable charge carriers allowing an efficient separation of dissolved ions, nucleic acids, viruses and/or microorganisms from the water.

In a further embodiment, the invention relates to the use of nanoparticles as disclosed herein (in particular to nanoparticles as disclosed in the second aspect) in the refinement and separation of mining ores. In this embodiment, the ores are suspended in a liquid medium and the nanoparticles attach specifically to the desired ore, allowing a fast and efficient separation of the desired ore by magnetic separation. The invention also relates to the use of nanoparticles as disclosed herein (in particular to nanoparticles as disclosed in the second aspect) in a process where cells, viruses or bacteria are removed from a continuous phase.

In a further embodiment, the invention relates to the use of nanoparticles wherein FG represents a chelating group selected from the group consisting of polycarboxylic acids, polyamides, aminoacids, polyaminocarboxylates (in particular EDTA, DTPA, EDDS) for separating dissolved material selected from the group of heavy metals (in particular arsenic, barium, beryllium, lead, selenium, thallium, quicksilver, chromium, cadmium, copper) in a process as described herein.

In a further embodiment, the invention relates to the use of nanoparticles wherein FG represents a $NR_3^+X^-$ or $PR_3^+X^-$ wherein R and X are as defined above, for separating dissolved material selected from the group of mono- and polynucleic acids (in particular DNA and RNA) in a process as described herein.

In a further embodiment, the invention relates to the use of nanoparticles wherein -$Z_m$-$FG_n$ represents —$(CH_2)_m$-Hal wherein m is as defined above and Hal represents a halogen atom (in particular wherein m represents 1 and Hal represents Cl) for separating dissolved material selected from the group of natural or synthetic carbohydrates (in particular mono- or poly saccharides) in a process as described herein.

In a further embodiment, the invention relates to the use of nanoparticles wherein FG represents $NH_2$, COOH, epoxides for separating dissolved material selected from the group of mono- or poly amino acids (enzymes, proteins) in a process as described herein.

EXAMPLES

While there are shown and described presently preferred embodiments of the invention, it is to be distinctly understood that the invention is not limited thereto but may be otherwise variously embodied and practiced within the scope of the following claims. The examples given below are intended to further illustrate the invention, without any intend to a limitation.

1. Preparation of Nanoparticles

Example 1.1

Preparation of Oleophilic Nanoparticles (Co/C)

Cobalt 2-ethylhexanoate in mineral spirits (Aldrich, 65 wt % Co) was diluted 2:1 with tetrahydrofurane prior to use. A spray nozzle was placed in a glove-box fed with nitrogen (PanGas, 5.0) which was recirculated by a vacuum pump (Busch, Seco SV1040CV) at about 20 m3/h. $CO_2$ and $H_2O$ were continuously removed from the recycle stream using two adsorption columns, packed with zeolite 4A and 13× (Zeochem), respectively. To avoid the accumulation of CO, NO and other impurities in the glove-box atmosphere a purge gas stream continuously passed the box. A sinter metal tube (GKN Sintermetalle, inner diameter 25 mm) surrounding the flame allowed radial inflow of an reactive carbon depositing gas (PanGas, Acetylene, tech 5 l/min diluted with N2, 25 l/min). A mass spectrometer (Balzers, GAM 400) was applied for the detection of the gas concentrations of H2, N2, CO2, NO, NO2 and O2. A separate data acquisition and control unit allowed controlling of the mass spectrometer, the liquid feed pump, mass flow controllers (Brooks) for sheath, dispersion and ignition gases as well as temperature of the box atmosphere and the adsorption columns. An oxygen concentration of below 100 ppm (volume/volume) was maintained during all experiments performed in the glove-box. The Co-carboxylate-based precursor was fed (6 ml/min, HNP Mikrosysteme, micro annular gear pump mzr-2900) to the spray nozzle where it was dispersed by oxygen (5 l/min, PanGas tech.) and ignited by a premixed methane/oxygen flame (CH4: 1.2 l/min, O2: 2.2 l/min, PanGas tech.). The produced particles were separated from the off-gas using glass fiber filters (Schleicher & Schuell, GF6).

The particles had a specific surface area of 15 m2/g as evaluated by nitrogen adsorption using the BET method resulting in a volume-surface-average diameter of 46 nm (according to: Janssen, Zirkzee, German and Maxwell, Journal of Applied Polymer Science 52, 1913, 1994). Transmission electron microscopy (FIG. 1) revealed spherical particles covered by several (3-5) layers of graphene. The carbon content of 2 wt % as evaluated by quantitative microanalysis using CHN-900 (Leco Instrumente GmbH) and resulted in an average thickness of the graphene coating of 0.7 nm (calculated using the specific surface area, SSA, the carbon content, CC, and the carbon density, ρc, as d=CC/ρc/SSA). The particles had a saturation magnetization of above 100 A m$^2$/kg and a coercive force of below 8,000 A/m as evaluated using a Physical Property Measurement System (Quantum Design). The material mass did not change more than 5 wt % upon heating in air, up to a temperature of 180° C., where it fully oxidized, as evidenced in a thermobalance.

Example 1.2

Chlorine Functionalization of Carbon Coated Cobalt Nanoparticles (Functionalized Co/c)

Figure 5:
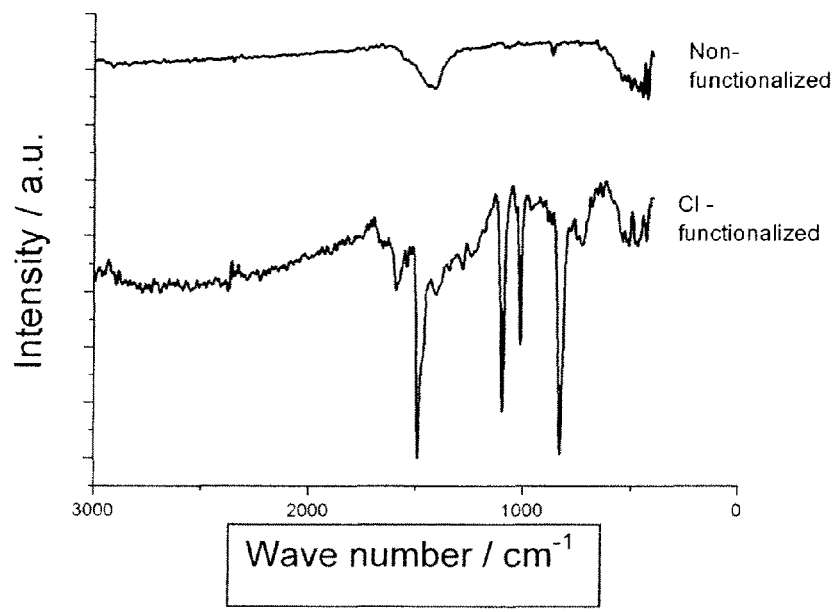
FIG. 5 shows an IR-spectrum of carbon coated cobalt nanoparticle (produced according to example 1) and the chlorobenzene functionalized nanoparticle (functionalized according to example 1.2) showing peaks characteristic for chlorine.
Figure 7:
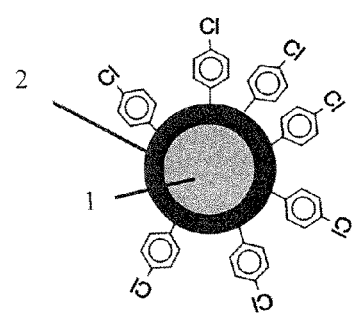
FIG. 7 gives a schematic representation of a functionalized carbon coated magnetic nanoparticle, obtainable e.g. according to ex. 1.2. (1=metallic core; 2=graphene shell)

4 mmol p-chloraniline (Fluka, tech.) was dissolved in 5 g water and 0.16 g concentrated hydrochloric acid. The mixture was cooled in an ice-bath and a cold solution of 0.04 g sodium nitrite (Fluka p.a.) in 3 ml of water was added. The reactant mixture was added to 100 mg of the nanopowder (from example 1.1) in 2 ml of water. Following agitation in an ultrasonic bath during 15 minutes, the magnetic particles were separated from the supernatant by a large neodymium based magnet (1×1×1 cm) and washed 3 times with water, 3 times with hexane and 3 times with ethyl acetate. Each washing step consisted of dispersing the particles in the solvent, agitating the mixture in an ultrasonic bath during 3 minutes and separating the particles from the fluid phase by the use of a magnet. The purified magnetic material had a chlorine loading (as determined by quantitative microanalysis) of 1.1 wt %. The material mass did not change more than 5 wt % upon heating in air, up to a temperature of 200° C., where it fully oxidized, as evidenced in a thermobalance. The chlorine functionalization of the magnetic nanoparticles is further visible by the use of an IR-spectrometer equipped with a diffuse reflectance unit. FIG. 5 displays an IR-spectrum of the functionalized sample showing peaks characteristic for C—Cl bonds (1593, 1490, 1095, 1012 and 829 cm-1) and no indication of amine groups (1275 cm-1) or remaining diazzonium-groups (2310-2130 cm-1) from the chlorine reactants (p-chloraniline and the in-situ generated diazonium salt of chlorobenzene). A schematic representation of a functionalized carbon coated metal nanoparticle is shown in FIG. 7.

Example 1.3

Nitro Functionalization of Carbon Coated Cobalt Nanoparticles

As-prepared carbon coated cobalt nanoparticles (150 mg, example 1.1) were suspended in a solution of 1 wt % SDS (sodium dodecyl sulfate) in water (10 ml) by the use of a ultrasonic bath (7 minutes). 4-nitrobenzenediazonium tetrafluoroborate (0.3 mmol) was added to the suspension and the mixture was left to react in the ultrasonic bath for 15 minutes. The reaction was stopped by removing the magnetic nanobeads from the reaction mixture by the use of a commercial neodymium based magnet. Washing was preformed similarly to the preparation of chloro functionalized nanobeads (water 3×, acetone 3×) and the particles were subsequently dried in vacuo at 60° C. The purified magnetic material had a nitro loading (as measured by quantitative microanalysis) of 0.1 mmol per gram. The IR absorbance spectrum of the material (5 wt % in KBr, Diffuse reflectance IR spectroscopy) showed characteristic nitrobenzene peaks (1595, 1520, 1350, 1110, 852, 750 cm-1).

Example 1.4

Amino Functionalization of Carbon Coated Cobalt Nanoparticles 100 mg as-prepared nitro functionalized carbon coated cobalt nanoparticles (example 1.3) were suspended in DMF (dimethylformamide, 20 ml) together with elemental sulfur (30 mmol) and $NaHCO_3$ (30 mmol). The mixture was kept at 130° C. under $N_2$ bubbling for 5 hours. After cooling the functionalized nanobeads were washed with DMF, water and acetone and dried in vacuo. The purified magnetic material that an amine loading (as measured by quantitative microanalysis of 0.1 mmol per gram. The IR absorbance spectrum of the material (5 wt % in KBr, Diffuse reflectance IR spectroscopy) showed characteristic aniline peaks (1615, 1505, 1290, 1190, 823 cm-1).

Example 1.5

Methyl Benzoate Functionalization of Carbon Coated Cobalt Nanoparticles 1.5 mmol 4-Aminobenzoic acid methyl ester (Fluka, tech.) was dissolved in 5 g water and 0.16 g concentrated hydrochloric acid. The mixture was cooled in an ice-bath and a cold solution of 2.3 mmol sodium nitrite (Fluka p.a.) in 12 ml of water was added. The reactant mixture was added to 1 g mg of the carbon coated cobalt nanopowder (from example 1.1) in 5 ml of water. Following agitation in an ultrasonic bath during 30 minutes, the magnetic particles were separated from the supernatant by a large neodymium based magnet (1×1×1 cm) and washed 3 times with water, 3 times with hexane and 3 times with ethyl acetate. After drying in vacuo at 60° C. the IR absorbance spectrum of the material (5 wt % in KBr, Diffuse reflectance IR spectroscopy) showed characteristic methylbenzoate peaks (1725, 1599, 1437, 1286, 1194, 1117, 1017, 774 cm-1). The functional loading of the material (from quantitative microanalysis) was 0.2 mmol/gram.

Example 1.6

Carboxy Functionalization of Carbon Coated Cobalt Nanoparticles 1 g of the methyl benzoate functionalized carbon coated cobalt nanoparticles (example 1.5) were suspended in boiling 4 N NaOH (20 ml) left to react for 3 hours. After cooling the particles were separated from the supernatant by a neodymium based magnet and washed 3 times with water, 3 times with hexane and 3 times with ethyl acetate. After drying of the material in vacuo at 60° C. the IR absorbance spectrum of the material (5 wt % in KBr, Diffuse reflectance IR spectroscopy) showed characteristic peaks for sodium benzoate (1595, 1414 cm-1).

Example 1.7

Benzylhydroxide Functionalization of Carbon Coated Nanoparticles 100 mg of the methyl benzoate functionalized carbon coated nanoparticles (example 1.5) were dispersed in a dry THF (tetrahydrofurane) solution containing 0.18 mMol $LiAlH_4$. The mixture was left to react for 1 hour at room temperature and quenched with 5 ml of 1 N HCl. The particles were separated from the mixture by the use of a neodymium based magnet and washed as described in example 1.2.

Example 1.8

Nitro Functionalization of Carbon Coated Iron Nanoparticles 150 mg of carbon coated iron nanoparticles purchased from Nanostructured and Amorphous Materials Inc. (stock No. 0277JY, average particle diameter 20 nm carbon content by elemental microanalysis 4.8 wt %), were suspended in a solution of 1 wt % SDS (sodium dodecyl sulfate) in water (10 ml) by the use of a ultrasonic bath (7 minutes). 4-nitrobenzenediazonium tetrafluoroborate (0.3 mmol) was added to the suspension and the mixture was left to react in the ultrasonic bath for 15 minutes. The reaction was stopped by removing the magnetic nanobeads from the reaction mixture by the use of a commercial neodymium based magnet. Washing was preformed similarly to the preparation of chloro functionalized nanobeads (water 3×, acetone 3×) and the particles were subsequently dried in vacuo at 60° C. The purified magnetic material had a nitro loading (as measured by quantitative microanalysis) of 0.1 mmol per gram. The IR absorbance spectrum of the material (5 wt % in KBr, Diffuse reflectance IR spectroscopy) showed characteristic nitrobenzene peaks (1595, 1520, 1350, 1110, 852, 750 cm-1). The functional loading (from quantitative microanalysis) of the material was 0.26 mmol/gram.

Example 1.9

Amino Functionalization of Carbon Coated Iron Nanoparticles 100 mg as-prepared nitro functionalized carbon coated iron nanoparticles (example 1.8) were suspended in DMF (dimethylformamide, 20 ml) together with elemental sulfur (30 mmol) and $NaHCO_3$ (30 mmol). The mixture was kept at 130° C. under $N_2$ bubbling for 5 hours. After cooling the functionalized nanobeads were washed with DMF, water and acetone and dried in vacuo. The purified magnetic material that an amine loading (as measured by quantitative microanalysis of 0.1 mmol per gram. The IR absorbance spectrum of the material (5 wt % in KBr, Diffuse reflectance IR spectroscopy) showed characteristic aniline peaks (1615, 1505, 1290, 1190, 823 cm-1). The functional loading (from quantitative microanalysis) of the material was 0.15 mmol/gram.

Example 1.10

Benzenesulfonic Acid Functionalization of Carbon Coated Cobalt Nanoparticles 1.5 mmol 4-Aminobenzenesulfonic acid was dissolved in 5 g water and 0.16 g concentrated hydrochloric acid. The mixture was cooled in an ice-bath and a cold solution of 2.3 mmol sodium nitrite (Fluka p.a.) in 12 ml of water was added. The reactant mixture was added to 1 g mg of the carbon coated cobalt nanopowder (from example 1.1) in 5 ml of water. Following agitation in an ultrasonic bath during 30 minutes, the magnetic particles were separated from the supernatant by a large neodymium based magnet (1×1×1 cm) and washed 3 times with water, 3 times with hexane and 3 times with ethyl acetate.

Example 1.11

Trimethylbenzenaminium Iodide Functionalization of Carbon Coated Cobalt Nanoparticles 1.5 mmol 4-Amino-N,N,N-trimethylbenzenaminium iodide monohydrochloride was dissolved in 5 g water and 0.16 g concentrated hydrochloric acid. The mixture was cooled in an ice-bath and a cold solution of 2.3 mmol sodium nitrite (Fluka p.a.) in 12 ml of water was added. The reactant mixture was added to 1 g mg of the carbon coated cobalt nanopowder (from example 1.1) in 5 ml of water. Following agitation in an ultrasonic bath during 30 minutes, the magnetic particles were separated from the supernatant by a large neodymium based magnet (1×1×1 cm) and washed 3 times with water, 3 times with hexane and 3 times with ethyl acetate.

Example 1.12

DTPA Functionalization of Carbon Coated Cobalt Nanoparticles 1 g amine functionalized carbon coated nanoparticles (example 1.4) were washed 2 times in 5 wt % aqueous ammonia solution and 4 times with dry DMF (demethylformamide). Under constant sonication using an ultrasonic bath the particles were then slowly added to a solution of 1.58 g of DTPAda (Diethylenetriaminepentaacetic acid dianhydride, Sigma-Aldrich, 98%) and 2.4 ml triethylamine. After heating the reaction mixture to 80° C. for 15 min, the particles were removed from the mixture by the use of a commercial neodymium based magnet and washed three times with 1 wt % triethylamine in dry DMF, pure DMF, water and least 4 times with ethanol and dried in vacuo at 40° C. The DTPA loading of the material (from elemental microanalysis) was 0.08 mmol per gram.

2. Oil-Water Separation

Example 2.1

Reference Example

Figure 6:
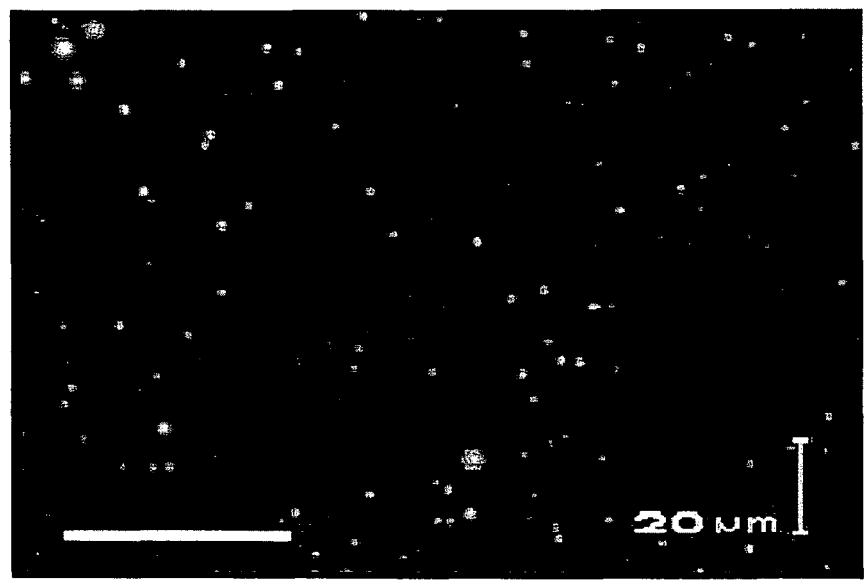
FIG. 6 shows a microscopy image of an oil/water emulsion at an oil concentration of 0.25 wt %.

An emulsion of 0.25% (weight/weight) of oil in water was prepared by mixing 0.5 g of crude oil (huil brut, supplied by Petroplus Refining Cressier SA) with 200 g of water (distilled) by the use of an ultrasonic bath (Bandelin, Sonorex) during 10 minutes resulting in a stable oil in water emulsion. A microscope image of the emulsion is displayed in FIG. 6, showing droplets in the size range of 1-7 microns, where at least 90% of all droplets are below 10 microns in diameter. The stability of the emulsion was measured by the emulsion turbidity: A polystyrene vial was filled with the mixture (1.5 ml) and the light absorbance was measured between 300 and 900 nm using a UV-Vis spectrometer (Shimadzu UV-1650) at the bottom of the vial (~0.5 cm from vial ground). The emulsion was highly turbid resulting from the light scattering and light absorption of the oil droplets suspended in the water phase. The time evolution of the light absorbance at the bottom of the vial at 900, 600 and 400 nm wavelengths is shown in Table 4. Due to the gravitational forces and the density difference between the oil and water phase, the oil droplets migrated towards the surface of the droplet. This decreased the absorbance of the sample at the bottom of the vial. While the absorbance (Table 4 at 900 nm decreased slowly, the turbidity at 400 nm hardly changed. This is in agreement with a rise of the large droplets, scattering at high wavelength, and only a very slow migration of the smaller droplets to the liquid surface, which scatter at lower wavelengths.

Example 2.2

Separation of Oil and Water Using Magnetic Oleophilic Nanoparticles

An emulsion of 0.25% (weight/weight) of oil in water was prepared by mixing 0.5 g of crude oil (huil brut, supplied by Petroplus Refining Cressier SA) with 200 g of water (distilled) by the use of an ultrasonic bath (Bandelin, Sonorex) during 10 minutes resulting in a stable oil in water emulsion. 200 mg of the highly oleophilic carbon coated cobalt nanoparticles produced via example 1 were added and the mixture was further agitated using the ultrasonic bath during 5 minutes. The stability of the emulsion was measured by the emulsion turbidity: A polystyrene vial was filled with the mixture (1.5 ml) and the light absorbance was measured between 300 and 900 nm using a UV-Vis spectrometer (Shimadzu UV-1650) at the bottom of the vial (~0.5 cm from vial ground). A permanent neodymium based magnet (N-48 neodymium Nd2Fe14B, cube with 1.2 cm edge length, 1.4 tesla) was placed on top of the vial throughout the absorbance experiment. The distance from the bottom of the vial to the center of the magnet was 2 cm). The time evolution of the light absorbance at the bottom of the vial (~0.5 cm from vial ground) at 900, 600 and 400 nm wavelength is shown in Table 4.

The quick decrease of the sample absorbance at the bottom of the vial indicates a quick rise of the oil particles to the surface of the liquid. This can be explained by a preferential emulsion of the highly oleophilic nanoparticles in the oil droplet. The nanoparticles are then attracted by the magnet placed on-top of the vial, leading in a migration towards the magnet, dragging the oil droplets along. Therefore this results in a total, nanoparticle driven, migration of the oil droplets towards the surface of the vial and a separation of the emulsion.

Results of example 2 are summarized in table 4 below. Absorbance is determined at the bottom of a vial.

| Time | Example 2.1 | | | Example 2.2 | | |
|---|---|---|---|---|---|---|
| (minutes) | 900 nm | 600 nm | 400 nm | 900 nm | 600 nm | 400 nm |
| 0 | 0.85 | 0.87 | 1.02 | 0.7 | 0.87 | 1.02 |
| 30 | 0.66 | 0.82 | 1.01 | 0.75 | 0.82 | 0.98 |
| 100 | 0.56 | 0.78 | 1.00 | 0.35 | 0.42 | 0.53 |
| 200 | 0.31 | 0.60 | 0.95 | 0.09 | 0.13 | 0.20 |
| 400 | 0.21 | 0.45 | 0.87 | 0.1 | 0.1 | 0.11 |

Example 2.3

Copper Ion Removal from a Solution with Dtpa Functionalized Carbon Coated Nanoparticles 60 mg of the DTPA functionalized carbon coated cobalt nanoparticles (c.f. ex. 1.12) were added to 20 ml of an aqueous solution containing 20 ppm copper (Cu(II) solution buffered at pH 6). After mixing for 5 minutes the magnetic particles were removed from the solution by the use of a commercial neodymium based magnet. The copper concentration in the supernatant solution was measured by AAS (atomic absorbance spectroscopy) resulting at below 2 ppm.

The invention claimed is:

1. A method for separating a dispersed phase or a dissolved material from a continuous phase comprising the steps of
i) contacting said phases with an effective amount of nanoparticles;
ii) applying a magnetic field gradient to the obtained system;
iii) separating the obtained phases
wherein said nanoparticles are of the core shell type, said core consists of a metal or alloy having soft magnetic properties and said shell contains one or more graphene-layers
said nanoparticles having saturation magnetization of at least 120 A m$^2$/kg,
said graphene layer having a thickness between 0.3-5 nm,
said graphene layer being functionalized by one or more of the groups according to formula (I):

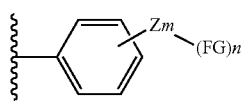

wherein
n is an integer between 1 and 5;
m is an integer between 0 and 20;
Z represents a spacer selected from the group of alkyl, alkenyl, alkyloxy, peptides, amino acids saccharides;
FG represents independent from each other OH, OR, NO$_2$, NH$_2$, NHR, NR$_2$, COH, COR, COOH, COOR, SO$_2$, SOR, SO$_2$R, halogen, P(O)OH, P(O)OR, P(O)$_2$OH, P(O)$_2$OR
R represents C$_1$-C$_4$alkyl, C$_1$-C$_4$alkoxy, C$_3$-C$_{10}$cyclo-alkyl, C$_4$-C$_{10}$ aryl, or a 5-membered heterocycle containing at least one atom selected from the group of N, O, S
or a 6-membered heterocycle containing at least one atom selected from the group of N, O, S
or a metal chelating group selected from the group consisting of polycarboxylic acids, polyamides, polyamides, amino acids, polyaminocarboxylates, polyamines, polysulfides;
and its salts.

2. The method according to claim 1 further comprising the steps of
iv) applying a magnetic field gradient or a chemical cleavage reaction to the phase containing the nanoparticles;
v) separating said nanoparticles from the remaining phase/material and
vi) optionally recycling the separated nanoparticles to step i).

3. A method for separating a dispersed phase from a continuous phase according to claim 1, comprising the steps of
i) contacting said phases with an effective amount of nanoparticles;
ii) applying a magnetic field gradient to the obtained system;
iii) separating the obtained phases
wherein said nanoparticles are of the core shell type, said core consists of a metal or alloy having soft magnetic properties and said shell contains one or more graphene-layers.

4. The method according to claim 1 wherein said continuous phase is a polar continuous phase.

5. The method according to claim 1 wherein said nanoparticles have a core diameter of 10-200 nm.

6. The method according to claim 1 wherein the maximal geometric standard deviation $\sigma_g$ of the diameter of said nanoparticles is smaller than 1.6.

7. The method according to claim 1 wherein said nanoparticles have a coercivity of below 30,000 A/m.

8. The method according to claim 1 wherein the core of said nanoparticles contains Fe, Co, Ni or its alloys.

9. The method according to claim 1 wherein said process is selected from the group consisting of mineral oil treatment processes, water treatment processes, chemical reaction processes, biochemical reaction processes and a process where cells, viruses or bacteria are removed from a continuous phase.

10. A method for separating a dissolved material from a continuous phase comprising the use of nanoparticles of the core shell type, wherein said core consists of a metal or alloy having soft magnetic properties and said shell consists essentially of one or more graphene layers
said nanoparticles having saturation magnetization of at least 120 A m$^2$/kg,
said graphene layer having a thickness between 0.3-5 nm,
said graphene layer being functionalized by one or more of the groups according to formula (I):

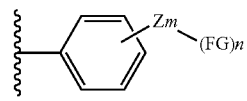

wherein
n is an integer between 1 and 5;
m is an integer between 0 and 20;

Z represents a spacer selected from the group of alkyl, alkenyl, alkyloxy, peptides, amino acids saccharides;

FG represents independent from each other OH, OR, $NO_2$, $NH_2$, NHR, $NR_2$, COH, COR, COOH, COOR, $SO_2$, SOR, $SO_2R$, halogen, P(O)OH, P(O)OR, $P(O)_2OH$, $P(O)_2OR$ R represents $C_1$-$C_4$alkyl, $C_1$-$C_4$alkoxy, $C_3$-$C_{10}$cyclo-alkyl, $C_4$-$C_{10}$ aryl, or a 5-membered heterocycle containing at least one atom selected from the group of N, O, S or a 6-membered heterocycle containing at least one atom selected from the group of N, O, S or a metal chelating group selected from the group consisting of polycarboxylic acids, polyamides, polyamides, amino acids, polyaminocarboxylates, polyamines, polysulfides;

and its salts.

11. The method according to claim 10 wherein the continuous phase is hydrophilic.

12. Nanoparticle of the core shell type, wherein said core consists of a metal or alloy having soft magnetic properties and said shell contains one or more graphene layers, said nanoparticles having saturation magnetization of at least 120 A $m^2$/kg, said graphene layer having a thickness between 0.3-5 nm, said graphene layer being functionalized by one or more of the groups according to formula (I):

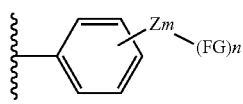
(I)

wherein n is an integer between 1 and 5;

m is an integer between 0 and 20;

Z represents a spacer selected from the group of alkyl, alkenyl, alkyloxy, peptides, amino acids saccharides;

FG represents independent from each other OH, OR, $NO_2$, $NH_2$, NHR, $NR_2$, COH, COR, COOH, COOR, $SO_2$, SOR, $SO_2R$, halogen, P(O)OH, P(O)OR, $P(O)_2OH$, $P(O)_2OR$ R represents $C_1$-$C_4$alkyl, $C_1$-$C_4$alkoxy, $C_3$-$C_{10}$cyclo-alkyl, $C_4$-$C_{10}$ aryl, or a 5-membered heterocycle containing at least one atom selected from the group of N, O, S or a 6-membered heterocycle containing at least one atom selected from the group of N, O, S or a metal chelating group selected from the group consisting of polycarboxylic acids, polyamides, polyamides, amino acids, polyaminocarboxylates, polyamines, polysulfides;

and its salts.

13. Nanoparticle according to claim 12 wherein n represents 1 and FG is in the para-position.

14. Nanoparticle according to claim 12 wherein R represents a metal chelating group selected from the group consisting of polycarboxylic acids, polyamides, amino acids, polyaminocarboxylates, polyamines and polysulfides.

15. Nanoparticle according to claim 12 wherein FG represents $NR_3^+X^-$ or $PR_3^+X^-$ wherein R represents $C_1$-$C_4$alkyl, and X represents halogen, $OH^-$, $SO_4^{2-}$, $SO_3^{2-}$, $NO_3^-$, $NO_2^-$, $CO_3^{2-}$, $HCO_3^-$.

16. A method for manufacturing a nanoparticle according to claim 12 comprising the step of reacting a nanoparticle of the core shell type, with a diazo-compound of formula (II)

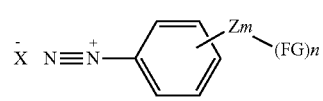
(II)

wherein

X represents a suitable anion, m, n, Z, FG are as defined in claim 17, optionally in the presence of a diluent and optionally in the presence of a reaction aid wherein said core of the core shell type nanoparticle consists of a metal or alloy having soft magnetic properties and said shell of the core shell type nanoparticle contains graphene layers.

17. A method of using nanoparticles according to claim 12 in biological and biochemical applications, or in the synthesis of a pharmaceutical comprising the step of separating a target compound from a continuous liquid phase.

18. A method of using nanoparticles according to claim 12 in diagnostic and clinical medicine and biological detection, said nanoparticles serve as a reagent carrier and comprising the steps of rapidly distributing the nanoparticles as a reagent carrier in a liquid sample and then rapidly collecting said particles by application of a magnetic field gradient.

19. A method of using nanoparticles according to claim 12 in the treatment of contaminated water or in the preparation of drinking water or in the preparation of process water, wherein said nanoparticles are covered with functional groups that include one or more chelating groups selected from the group consisting of polycarboxylic acids, polyamides, amino acids, polyamines, polysulfides and polyaminocarboxylates wherein said method comprises the step of contacting said nanoparticles with water.

20. A method of using nanoparticles according to claim 12 in the refinement and/or separation of mining ores, comprising the steps of suspending said ores in a liquid phase and attaching said nanoparticles specifically to the desired ore.

21. A nanoparticle according to claim 12 where m is an integer from 2-20.

22. A nanoparticle according to claim 12 wherein said core contains Fe, Co, Ni or its alloys.

23. A nanoparticle according to claim 12 wherein said core consists of Fe, Co or its alloys.

* * * * *